(12) United States Patent
Unger et al.

(10) Patent No.: US 12,170,734 B2
(45) Date of Patent: Dec. 17, 2024

(54) SYSTEM AND METHOD FOR OFF-CHAIN CRYPTOGRAPHIC TRANSACTION VERIFICATION

(71) Applicant: iComply Investor Services Inc., Vancouver (CA)

(72) Inventors: Matthew Unger, Vancouver (CA); Matej Masiar, Vancouver (CA); Qayyum Rajan, Surrey (CA)

(73) Assignee: iComply Investor Services Inc., Vancouver (CA)

( * ) Notice: Subject to any disclaimer, the term of this patent is extended or adjusted under 35 U.S.C. 154(b) by 0 days.

(21) Appl. No.: 18/503,625

(22) Filed: Nov. 7, 2023

(65) Prior Publication Data

US 2024/0080205 A1  Mar. 7, 2024

Related U.S. Application Data

(63) Continuation of application No. 17/548,562, filed on Dec. 12, 2021, now Pat. No. 11,849,051, which is a continuation of application No. 16/516,245, filed on Jul. 18, 2019, now Pat. No. 11,201,751.

(60) Provisional application No. 62/699,908, filed on Jul. 18, 2018.

(51) Int. Cl.
*H04L 29/06* (2006.01)
*H04L 9/06* (2006.01)
*H04L 9/32* (2006.01)
*H04L 9/00* (2022.01)

(52) U.S. Cl.
CPC .......... *H04L 9/3265* (2013.01); *H04L 9/0637* (2013.01); *H04L 9/50* (2022.05); *H04L 2209/56* (2013.01)

(58) Field of Classification Search
CPC ................ H04L 9/3265; H04L 9/0637; H04L 2209/56; H04L 2209/38; H04L 63/101; H04L 9/3239
See application file for complete search history.

(56) References Cited

U.S. PATENT DOCUMENTS

| 10,594,484 | B2 * | 3/2020 | Rodriguez | ............ H04L 9/0861 |
| 2016/0012465 | A1 * | 1/2016 | Sharp | ................... G06Q 20/321 |
| | | | | 705/14.17 |

(Continued)

*Primary Examiner* — Mahfuzur Rahman
(74) *Attorney, Agent, or Firm* — Marin Patents LLC; Gustavo Marin

(57) ABSTRACT

Systems and methods for off-chain verification of cryptographic transactions are disclosed. The system receives a first transaction from a first blockchain, wherein the first transaction is associated with a first address of a first user device and receives a notification of an analysis of a whitelist status for the first transaction. The system performs a first off-chain check on the first transaction to determine validity of the first transaction and if the first off-chain check fails, determines whether a second off-chain check is required. If the second off-chain check is required the system performs the second off-chain check and if the second off-chain check fails, determines whether a supervised check is required. If the supervised check is required, the system sends transaction parameters of the first transaction to a second user device and submits transaction details to the first blockchain if an approval is received from the supervisor user device.

22 Claims, 12 Drawing Sheets

(56) References Cited

U.S. PATENT DOCUMENTS

2016/0086263 A1\* 3/2016 Weinflash ............. G06Q 40/03
 705/38
2018/0350180 A1\* 12/2018 Onischuk ............... G07C 13/00

\* cited by examiner

SYSTEM AND METHOD FOR OFF-CHAIN CRYPTOGRAPHIC TRANSACTION VERIFICATION

CROSS-REFERENCE TO RELATED APPLICATIONS

This application is a continuation to U.S. patent application Ser. No. 17/548,562 titled "SYSTEM AND METHOD FOR OFF-CHAIN CRYPTOGRAPHIC TRANSACTION VERIFICATION" filed Dec. 12, 2021 which is a continuation of U.S. patent application Ser. No. 16/516,245 titled "SYSTEM AND METHOD FOR OFF-CHAIN CRYPTOGRAPHIC TRANSACTION VERIFICATION" filed Jul. 18, 2019, which claims the benefit of, and priority to, U.S. provisional application 62/699,908 titled, "OFF-CHAIN CRYPTOGRAPHIC CURRENCY VERIFICATION" filed on Jul. 18, 2018, the entire specifications of which are incorporated herein by reference.

BACKGROUND OF THE INVENTION

Field of the Art

The disclosure relates to the field of information security, and more particularly to the field of securely maintaining compliance in a blockchain environment.

Discussion of the State of the Art

In systems known in the art, typical blockchain infrastructure do not handle security tokens in accordance with specific or desired rulesets (for example, securities regulation). A few projects have attempted to create compliant tokens on those platforms, but their approaches are either complicated, or ineffective.

Security tokens need to be issued in compliance with the regulation, as well as continue to be compliant during secondary trading. Some of the challenges include but are not limited to:

Verifying investor identities;
Ensuring investment limits per investor and per raise;
Distinguishing between an address and a legal entity that can own multiple addresses;
Manual reviews of each security transfer;
Procedures for locking off an account in case it gets compromised, funds get stolen, or an identity lapse;
Preventing any unauthorized or non-compliant transfers of securities from taking place, rather than reversing those transfers later.

Accordingly, what is needed is systems and methods for executing compliance systems and methods in an off-chain environment to offload computationally-intensive parts of a compliance process so as not to delegate compliance algorithms to the costly virtual machines often used for on-chain smart contracts.

What is further needed in the art is an execution of rules to be consistent across multiple chains and not rely on the limitations of any given protocol to guarantee a cost of executing a transaction be kept to a minimum and keep an on-chain overhead minimal.

SUMMARY OF THE INVENTION

Accordingly, the inventor has conceived and reduced to practice, in a preferred embodiment of the invention, a system and method for compliance of transactions in a blockchain environment and distributed ledger technologies using off-chain information without co-ownership of private keys.

In system known in the art, a blockchain infrastructure does not handle security tokens in accordance with pre-defined rules (for example, securities regulation). Security tokens need to be issued in compliance with a regulation, as well as continue to be compliant during, for example, their secondary trading. Some of the advantages of the embodiments disclosed herein, in n investment embodiment, include but are not limited to: verifying investor identities; ensuring investment limits per investor and per raise; distinguishing between an address and a legal entity that can own multiple addresses; enabling manual reviews of each security transfer before execution of the transfer, and the like.

An embodiment enables manual reviews of the security transfers that need to be manually reviewed, by generating a prompt or by using other tools for enabling a review. The security transfers that need to be reviewed may be determined on a case-by-case basis. For example, one side of a security transfer may by determined to be a competitor to an issuer which, in case of an equity token, may enable the competitor to own a stake in the issuer. An embodiment herein identifies such scenario and enables review before the transfer is authorized; procedures for locking off an account in case it gets compromised, funds get stolen, or an identity lapse; or, preventing any unauthorized or non-compliant transfers of securities from taking place, rather than reversing those transfers later.

Systems and methods disclosed herein comprise a combination on-chain and off-chain solutions to address the above-mentioned issues in an efficient manner. In the on-chain solution, a whitelist may be used that acts as a first, basic filter. This may be to stop a majority of spam transactions and/or transactions that are not valid. Off-chain solutions may take the actual transactions and process them through a logic engine to ensure that the transaction is valid. Therefore, an embodiment performs a check on the chain that removes the clear spams, and then uses more checks outside of the chain to complete the process.

Combining on-chain and off-chain solutions may be made up of a few distinct steps. A first step may be KYC and whitelist. Systems and methods disclosed herein verify an identity of each use profile (for example, a profile associated to an individual investor) requesting a purchase of a security. If the identity passes one or more required checks (AML, CFT, etc.), the profile may submit a cryptocurrency address. Examples of cryptocurrency addresses are: 1JwSSubhmg6iPtRjtyqhUYYH7bZg3Lfy1T, 0x5ed8cee6b63b1c6afce3ad7c92f4fd7e1b8fad9f. Only those specified addresses are whitelisted to send or receive the security tokens.

A next step may be a logic verification of one or more transactions. In an embodiment, at least a portion of transactions surrounding a purchase or transfer of tokens may be executed by a rules engine whereby one or more rules are verified (for example, rules imposed by the security regulation and/or a token issuer) before any tokens are permitted to move from one user profile to another.

In some embodiments, a plurality of addresses may be associated to a single user profile. An embodiment herein does not apply rules per address, but instead, per profile (e.g. "99 users can own shares", rather than "99 addresses can own shares"). An embodiment herein determines which profile are associated to each address and may combine them without revealing an owner of a particular address. In an embodiment, these rules may be executed off-chain with a notification to a user profile associated to the cryptocurrency address, rather than on a per-address basis whereby many factors are taken into consideration, including but not limited to a jurisdiction associated to a sender profile and a receiver profile, regulation requirements (for example, requirements imposed by financial and securities regulators associated to the jurisdictions of the sender profile or the receiver profile, or both), balance requirements (for example requirements imposed by the total balance held by them across all associated addresses) and whether a trigger of additional restrictions imposed by the token issuer.

In a preferred embodiment, only if all the checks pass, the transfer or purchase of tokens is permitted to go execute.

In a different approach to performing a verification, a larger ruleset may be applied (for example, an entire body of securities law such as a global body of securities laws) may be embedded in a smart contract and executed each time a transaction takes place. The transfer of securities may be controlled by the transaction validator being an owner of the private keys that make up a multi-signature address controlling the security tokens. Executing the rules off-chain means the most computationally-intensive parts of the process are not delegated to the costly virtual machines often used for on-chain smart contracts. This may also mean that the execution of rules may be consistent across multiple chains and not rely on the limitations of any given protocol. This may guarantee a cost of executing a transaction are (for example, cost kept to a minimum) and keep the on-chain overhead minimal.

In some embodiments, a validator owning one of the multi-signature address keys may introduce complications (for example, according to pre-defined rules and/or laws). For example, in a joint account where a specific minimum number of the account holders may be required to sign off on a transaction for the transaction to take place. In some embodiments, all of the addresses are associated to the same user profile; in some embodiments, addresses are associated to a plurality of user profiles, and in some embodiments, addresses may be associated to a user profile and a service provider profile. An example of a multi-signature wallet is 3D2oetdNuZUqQHPJmcMDDHYoqkyNVsFk9r. In theory, there would be no difference between the actual owner of the security, and the validator that is only supposed to be a co-signatory to a transaction without actually owning any of that security. Those two roles are indistinguishable from the blockchain perspective in systems known in the art.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
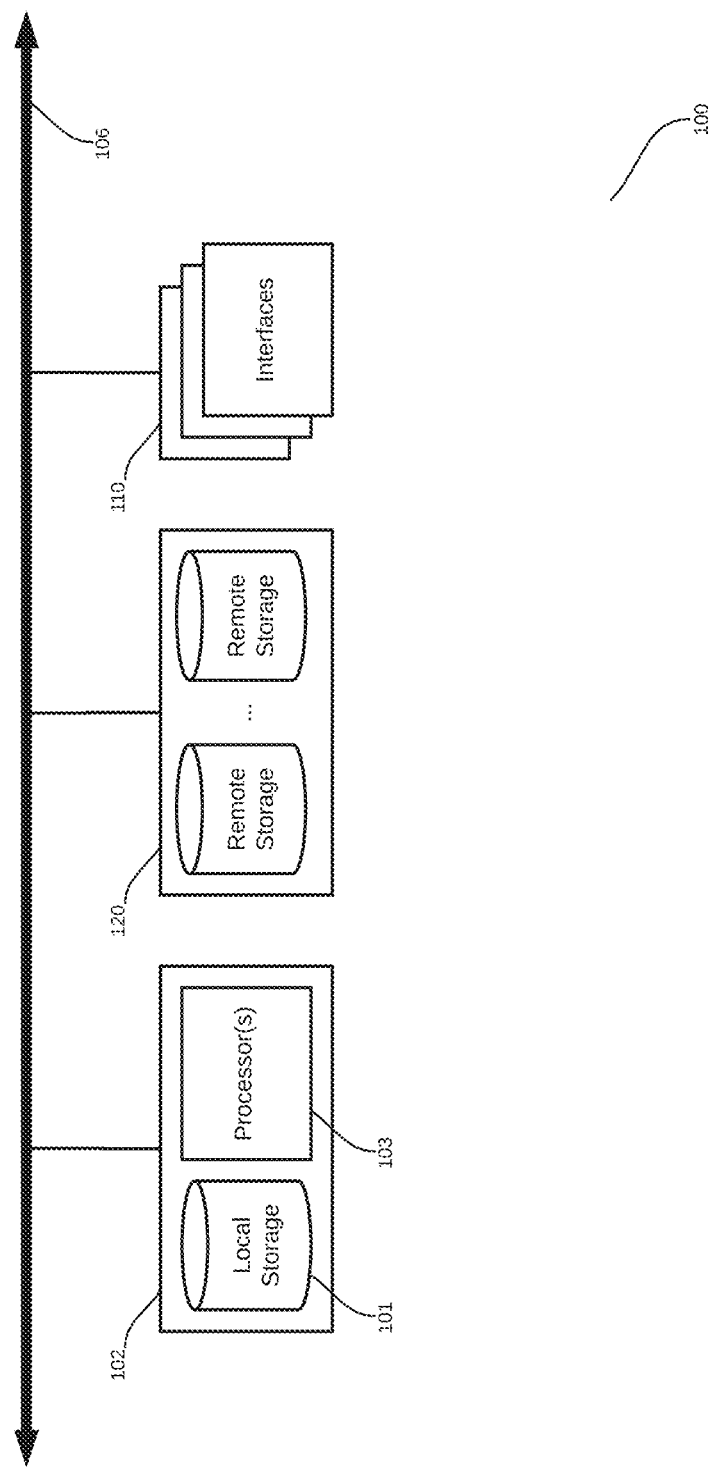
FIG. 1 is a block diagram illustrating an exemplary hardware architecture of a computing device used in an embodiment of the invention.

The inventor has conceived, and reduced to practice, a system and method for block reconciliation in a multi-party public ledger blockchain environment.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions, and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
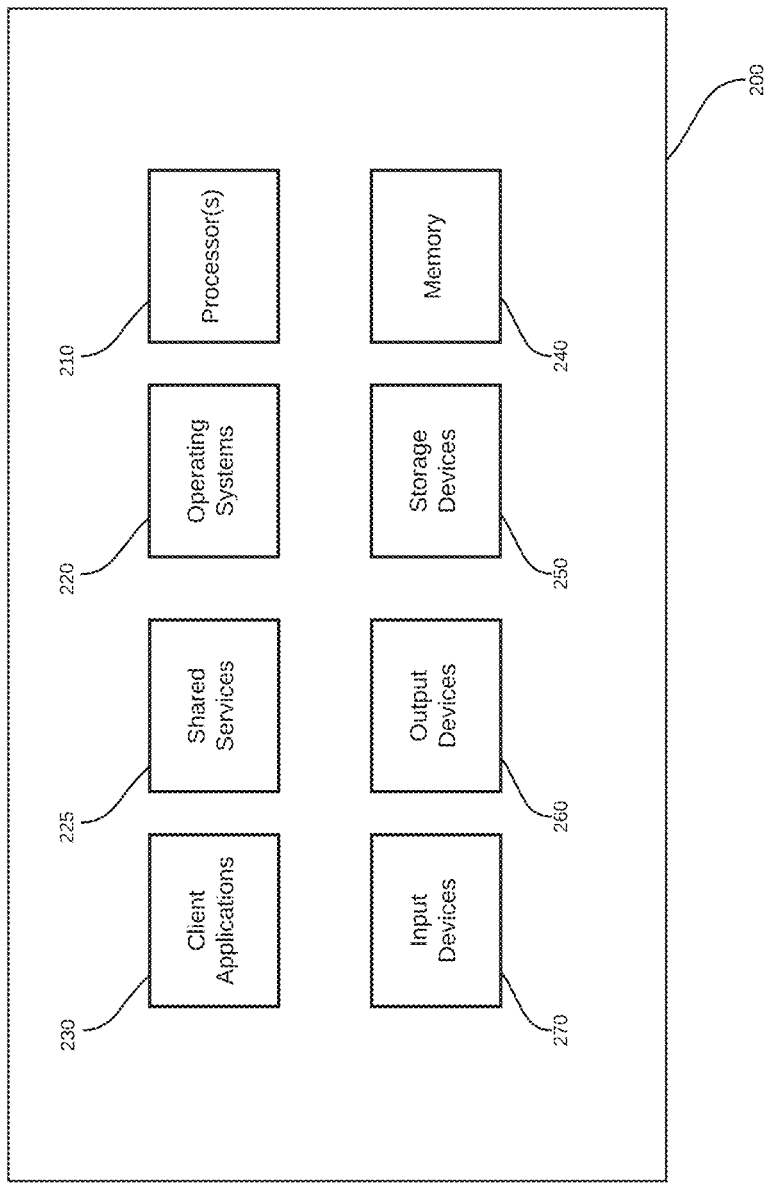
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
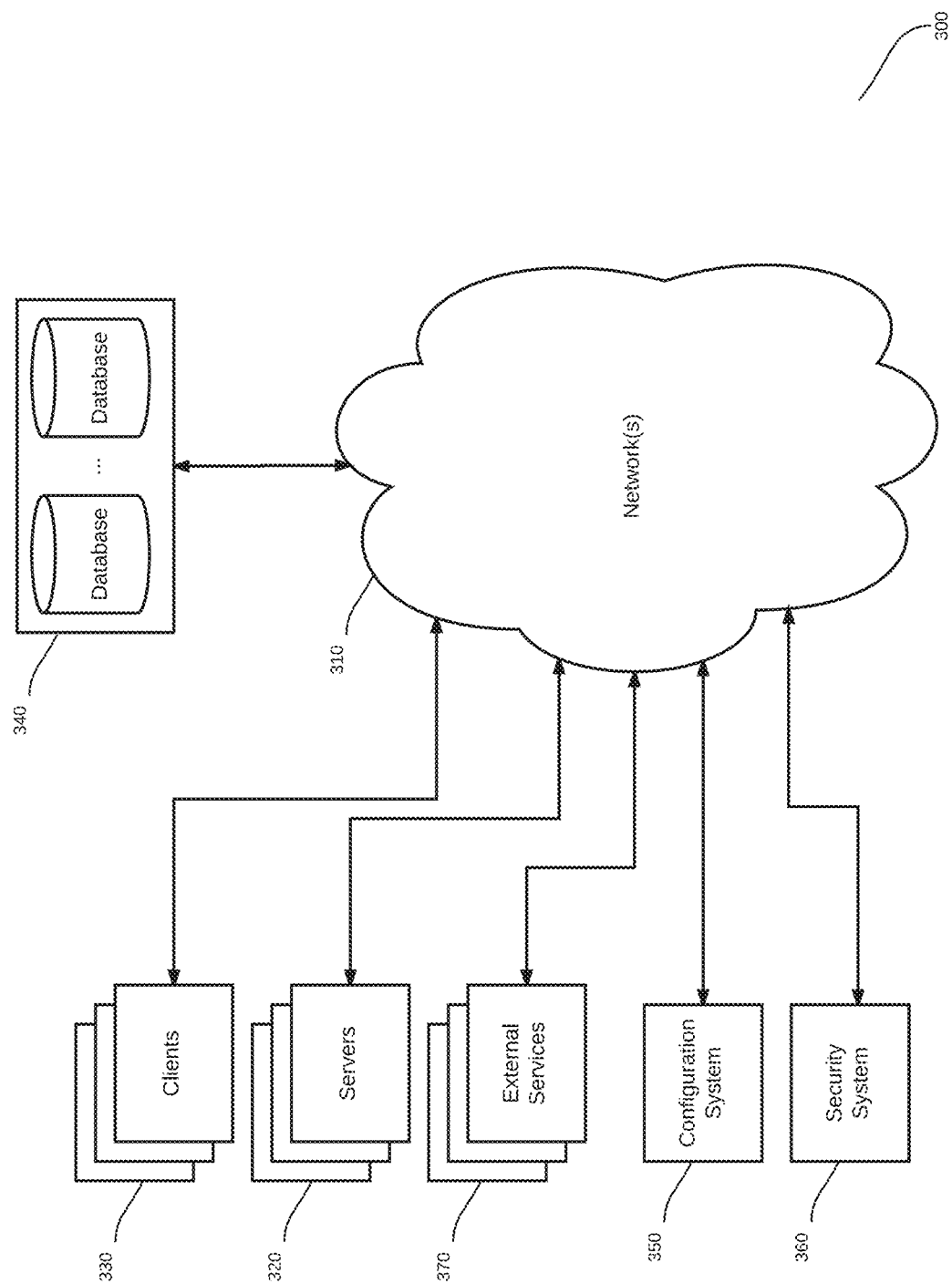
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
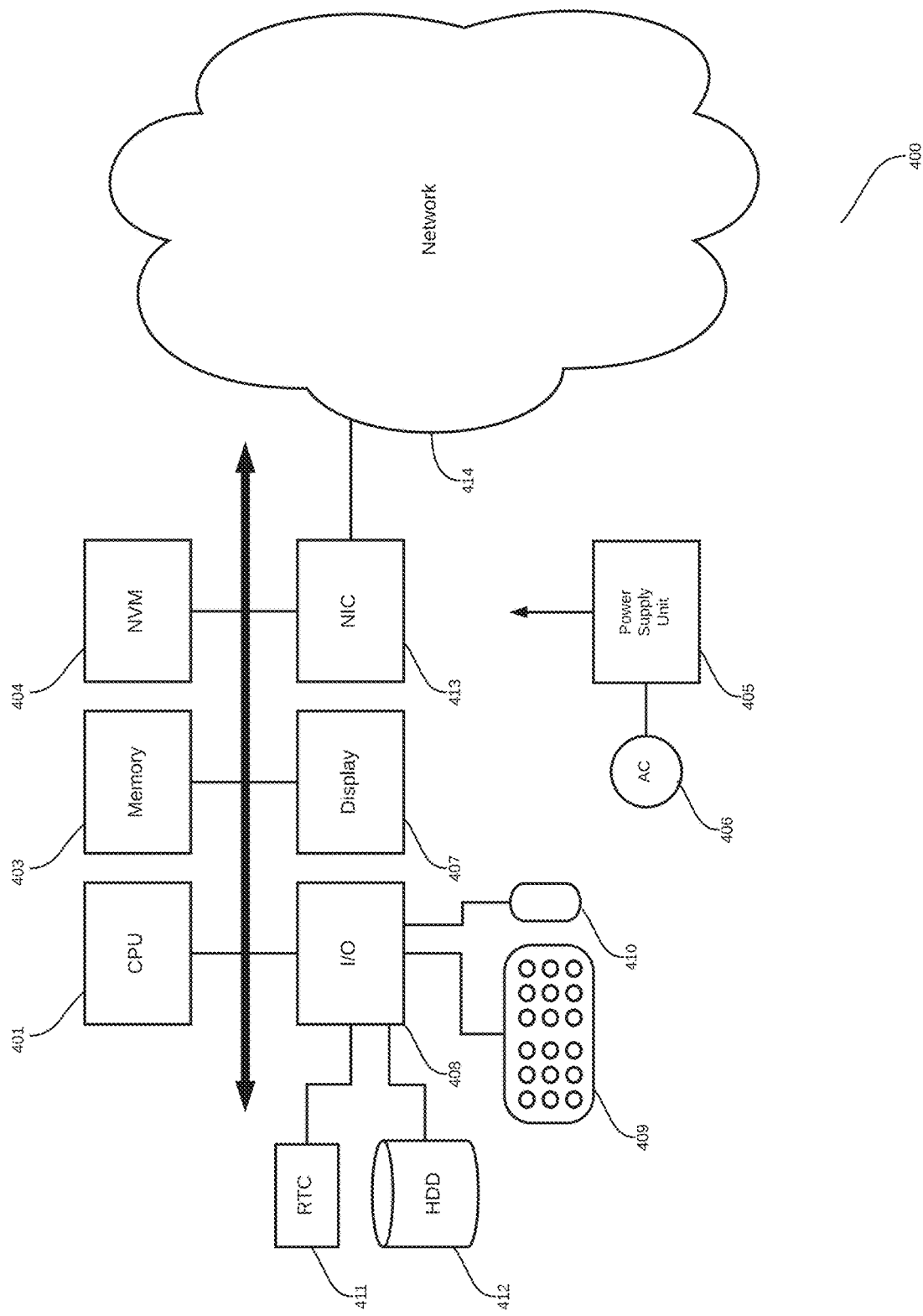
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also, shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 5:
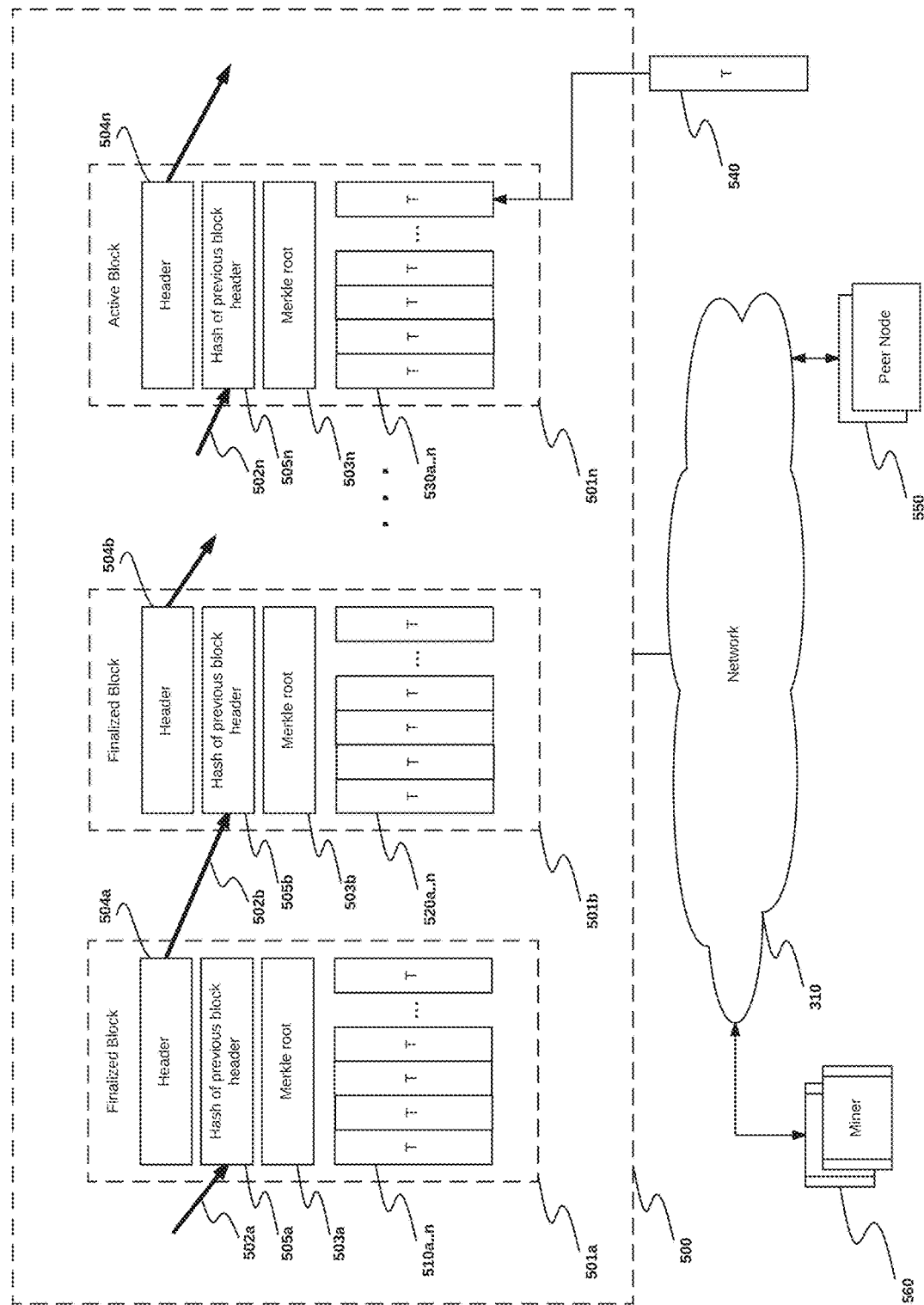
FIG. 5 is a block diagram illustrating a blockchain system, according to a preferred embodiment of the invention.

FIG. 5 is block diagram illustrating an exemplary blockchain, according to a preferred embodiment of the invention. According to the embodiment, blockchain 500 comprises a plurality of blocks 501a . . . n configured in a form of a distributed database that maintains a continuously growing list of data records (or blocks) that are hardened against tampering and revision, including the operators of peer nodes 550. The most widely known application of a blockchain is the public ledger of transactions for the Bitcoin™ network, although the concept of blockchains can be implemented for any kind of decentralized record keeping system, as demonstrated by the use of blockchain in other alternate cryptocurrency networks such as Namecoin™, Ethereum™, NXT™, and the like. Most of the well-known implementation of blockchain are as a public ledger of transactions, such that all the interactions recorded on the blockchain is open to scrutiny and examination by anyone. Although it is possible to have other modified implementation of the blockchain including ones where the interactions recorded on the blockchain (or the properties of the interactions) are kept private.

Accordingly, in a blockchain, "blocks" or sets of completed transactions 510a . . . n and 520a . . . n (such as transferring cryptocurrency funds from one account to another, as with Bitcoin™) are periodically updated. During an update, a block is pushed from one node (generally, an originating node where a transaction completed, for example a user device used to receive or send funds) to other nodes rapidly, enabling every node in the system to maintain an up-to-date record of all transactions. Using distributed nodes, data integrity is maintained through general consensus, protecting the blockchain against tampering or errors such as might arise if nodes lose connectivity or are run autonomously and produce errors during unattended operation. The general consensus method may also enable any one node to verify a transaction with other copies of the blockchain, preventing counterfeiting or tampering.

Using a blockchain arrangement 500, signatures for recordings may be published to a blockchain either using a blockchain specifically configured for such use (for example, where each "transaction" is a single recording's unique signature), or by "piggybacking" on an existing blockchain by conducting zero-sum transactions and attaching signature data to them (for example, by using a signature as a destination wallet for a fund transfer, so it is irrevocably stored in the blockchain). In this regard, signatures may be published in a manner that is publicly accessible, easily verified and validated, and resistant to tampering or forgery.

In an exemplary implementation, blockchain 500 may contain unique identifiers which allow user devices to send and receive various tokens between various participants *that is, devices) on the network. An exact implementation of the address mechanism might change between the different implementations of blockchain 500. For example, In the bitcoin embodiment of a blockchain, addresses are created and managed using, for example, a SHA-256 based public key/private key mechanism. The following is an example bitcoin address:

1JArS6jzE3AJ9sZ3aFij1BmTcpFGgN86hA

The bitcoin address allows a plurality of user devices to send and receive tokens from a plurality of other user devices on a bitcoin network. Each time any of these tokens are sent from one bitcoin address to another, transaction 540 gets created on blockchain 500. Transaction 540 then gets validated by the network of peer nodes 550, to see if it is authentic. If confirmed to be authentic, then transaction 540 gets permanently recorded on blockchain 500, as part of the latest block 501n. In this regard, every Bitcoin address has a matching private key, where the bitcoin address itself acts as the public key. The private key is mathematically related to an associated bitcoin address and is designed so that the bitcoin address can be calculated from the private key, but importantly, the same cannot be done in reverse. A transaction of tokens out of a bitcoin address can only be initiated by the owner of the private key.

Note that a bitcoin address may also be created and operated by programmable instructions on a computer often referred to as smart contracts or smart contract code. These smart contracts can control and operate their bitcoin addresses, in an autonomous manner based on certain conditions as defined by their programming logic. These smart contracts may be used to automate transaction logic that may need to happen on the blockchain.

Although bitcoin is the primary token that gets transferred between users on the bitcoin network, the bitcoin blockchain can be used to issue and transact in several other custom created tokens. These tokens may be collectively referred to as "interaction objects" (as is described later). The creation of interaction objects on the bitcoin blockchain can be enabled using an overlay network protocols (e.g., Counterparty, Mastercoin, Colored coins, etc.) or using several other alternate techniques including but not limited to side chain implementations.

The bitcoin blockchain has been used in a number of instances to explain principles and concepts throughout this document, as it is an exemplary embodiment of a blockchain. The use of blockchain and other related concepts are in no way limited to the bitcoin blockchain. Any number of other related or different implementations of blockchain may be used by a valid embodiment of the present invention, including other alternate implementations of the blockchain such as NXT, Ethereum or other private blockchains.

A hash function or a hash algorithm may be any function that can be used to map one or more data inputs of arbitrary size into fixed or varying length data, such that the mapped data acts as a unique identifier for the input data. The values returned by a hash function can be referred to as hash values, hash codes, hash sums, unique hash identifiers or simply hashes. Some of the more common hashing functions that rely on cryptography include SHA1, SHA2, SHA256 and MD5. But hashing function can use several other techniques including non-cryptographic technologies, such as simple merging of all the data inputs, or passing along the input data unaltered provided the input data is already unique.

Encryption is a process of coding information which could either be a file or mail message in into cipher text a form unreadable without a decoding key in order to prevent anyone except the intended recipient from reading the encrypted data. Decryption is the reverse process of converting encoded data to its original un-encoded form, for example, plaintext.

A key in cryptography is a long sequence of bits used by encryption/decryption algorithms. For example, the following represents a hypothetical 40-bit key:

00001010 01101001 10011110 00011100 01010101

An encryption algorithm may take an original message, and a key (for example, a private key), and alters the original message mathematically based on the key's bits to create a new encrypted message. Likewise, a decryption algorithm takes an encrypted message and restores it to its original form using one or more keys. When a user device encodes a piece of information, another user cannot decode and read that piece of information without the decryption key (for example, a public key). Through this mechanism one can add a digital signature to digital content/information, such that it acts as a form of personal authentication, ensuring the integrity of the original message. To encode plaintext, an encryption key is used to impose an encryption algorithm onto the data. To decode cipher, a user must possess the appropriate decryption key. A decryption key consists of a random string of numbers, for example, from 40 through 2,000 bits in length. The key imposes a decryption algorithm onto the data. This decryption algorithm reverses the encryption algorithm, returning the data to, for example, plaintext. The longer the encryption key is, the more difficult it is to decode. For a 40-bit encryption key, over one trillion possible decryption keys exist.

There are two primary approaches to encryption: symmetric and public-key (or asymmetric). Symmetric encryption is the most common type of encryption and uses the same key for encoding and decoding data. This key is known as a session key. Public-key (or asymmetric) encryption uses two different keys, a public key and a private key. One key encodes the message and the other decodes it. The public key is widely distributed while the private key is secret. Some examples of popular symmetric key algorithms are, AES, 3DES modes along with the original DES algorithm and its block cipher modes. Some examples of public-key (or asymmetric) encryption algorithms include, DSS, RSA, ECDSA.

Aside from key length and encryption approach, other factors and variables impact the success of a cryptographic system. For example, different cipher modes, in coordination with initialization vectors and salt values, can be used to modify the encryption method. Cipher modes define the method in which data is encrypted. The stream cipher mode encodes data one bit at a time. The block cipher mode encodes data one block at a time. Block encryption may be used to implement a digital signature mechanism used to prove authenticity in various scenarios.

Blockchain 500 may comprises of a series of a plurality of grouped together transactions (or blocks) 501a . . . n, that may be linked to one another in a time linear manner 502a . . . n. One or more new transactions 510a . . . n, 520a . . . n, 530a . . . n may be collected into the transaction data part 510a . . . n, 520a . . . n, and 530a . . . n of each respective block 501a . . . n. In some embodiments, copies of each transaction may be hashed, and the hashes could then be paired, hashed, paired again, and hashed again until a single hash remains, which could act as the merkle root 503a of a merkle tree 503a . . . n. A merkle root 503a . . . n may be stored in block header 504a . . . n. Each block could also store the hash 505a . . . n of the previous block's header, chaining the blocks together. Accordingly, a transaction cannot be modified without modifying the block that records it and all following blocks. Chaining blocks together in this fashion makes it impossible to modify transactions included in any block without modifying all following blocks. Thus, the cost to modify a block increases with every new block added to the blockchain. This system provides a robust way to prevent the tampering of the transactions on blockchain 500. Blockchain 500 may be collaboratively maintained by anonymous peer nodes 550 on the network, as parts of the blockchain network or, in other embodiments, peer nodes 550 may not be anonymous. The blockchain might be part of a global network via network 310, as in the case with bitcoin. In other embodiments, network 310 may be a local network.

Miners 560 provide a process for adding transaction records to a ledger of transactions (that is, blockchain 500) as blocks. Blockchain 500 can be seen as chain of blocks 510a . . . n, 520a . . . n, 530a . . . n, etc. Blockchain 500 serves to confirm transactions, for example, transaction 540) to the rest of the network as having taken place. Nodes use blockchain 500 to distinguish legitimate transactions from attempts to manipulate transactions that have already taken place. Miners 560 are resource-intensive and difficult so that the number of blocks found each day by miners 560 remains steady. Individual blocks must contain a proof of work to be considered valid. This proof of work is verified by other blockchain 500 nodes (for example, peer nodes 550) each time they receive a block. For example, in a Bitcoin arrangement, a hashcash proof-of-work function is used. In a preferred embodiment, miners 560 allow nodes to reach a secure, tamper-resistant consensus. Miners 560 may also be a mechanism used to introduce blocks into the system (in some embodiments, in conjunction with other components). In some embodiment, miners 560 are compensated with transaction fees as well as a "subsidy" of newly created nodes. This both serves the purpose of disseminating new nodes in a decentralized manner as well as motivating connected devices to provide security for systems disclosed herein.

Figure 6:
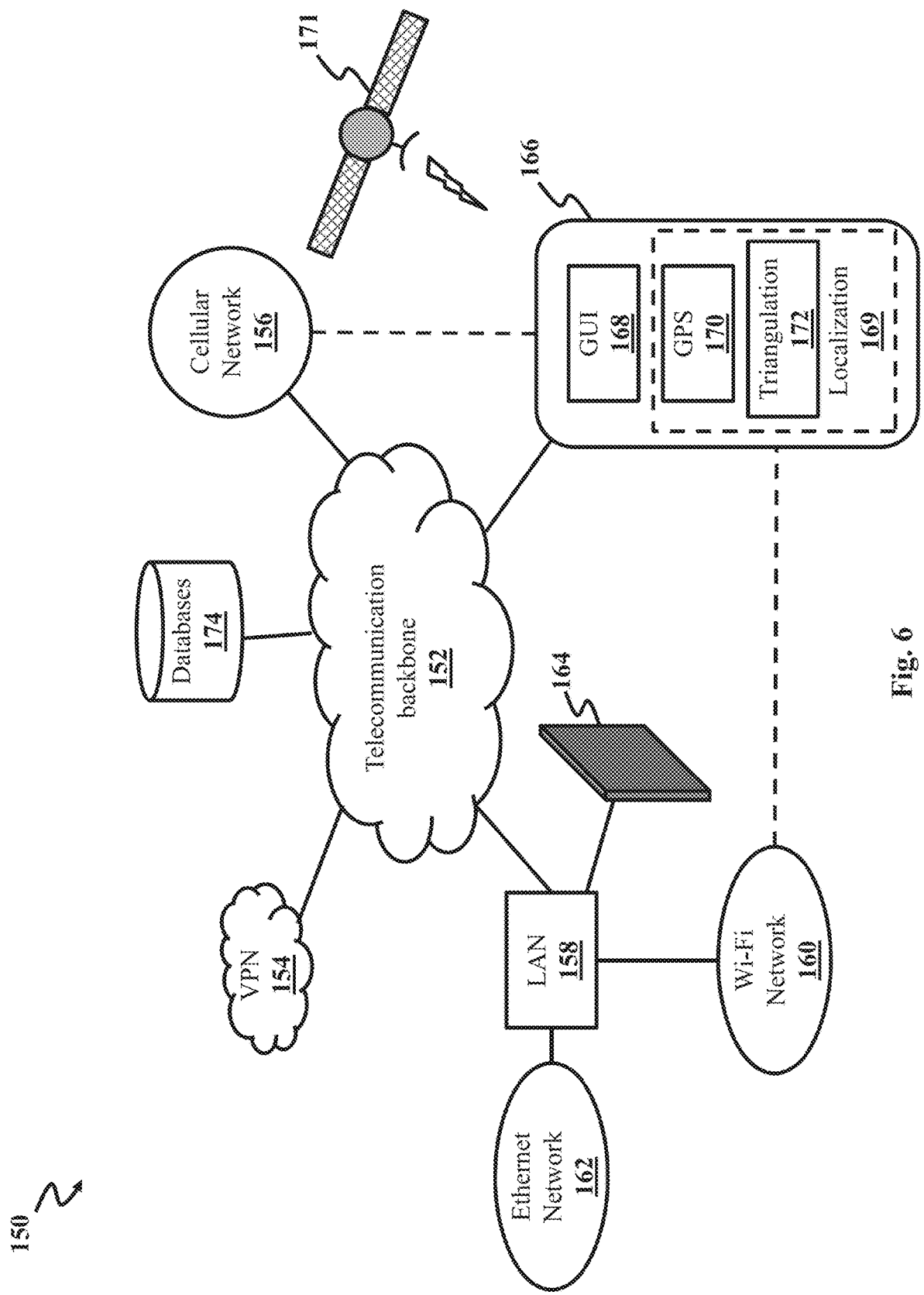
FIG. 6 is a schematic diagram of a distributed telecommunication network, according to an embodiment of the invention.

FIG. 6 is a schematic diagram of a distributed telecommunication network 150. The distributed telecommunication network 150 may include a virtual private network (VPN) 154, communicatively coupled to a backbone 152 of the distributed telecommunication network 150. The distributed telecommunication network 150 may include a cellular network 156, communicatively coupled to the backbone 152 of the distributed telecommunication network 150.

The distributed telecommunication network 150 may include a local area network (LAN) 158, communicatively coupled to the backbone 152 of the distributed telecommunication network 150. The distributed telecommunication network 150 may include an Ethernet network 162, communicatively coupled to the local area network 158. The distributed telecommunication network 150 may include a Wi-Fi network 160, communicatively coupled to the local area network 158.

The distributed telecommunication network 150 may include one or more databases 174 communicatively coupled to the backbone 152 of the distributed telecommunication network 150. In an example, the distributed telecommunication network 150 may include multiple databases communicatively coupled to the backbone 152 of the distributed telecommunication network 150. All devices that are communicatively coupled to the distributed telecommunication network 150 may access the database 174, or the multiple databases communicatively coupled to the backbone 152 of the distributed telecommunication network 150.

The distributed telecommunication network 150 may include a firewall 164 for security purposes, communicatively coupled to the local area network 158. The distributed telecommunication network 150 may include a device 166, communicatively coupled to the Wi-Fi network 160 and the cellular network 156. The devise 166 may be a stationary or a mobile device. The device 166 may include a graphical user interface (GUI) 168 for receiving commands and display text and graphic data received over the distributed telecommunication network 150.

The device 166 may include a localization module 169, communicatively coupled to the GUI 168. The localization module 169 may include a global positioning system (GPS) module 170 communicatively coupled to a geo satellite 171 and configured to initialize a determination of a location of the device 166. The localization module 169 may include a triangulation module 172 communicatively coupled to the cellular network 156 and configured to determine an accurate location of the mobile device using the initial determination of the location by the GPS module 170.

In an embodiment, the distributed network 150 may be used as one of the platforms used in performing the embodiments herein.

Figure 7:
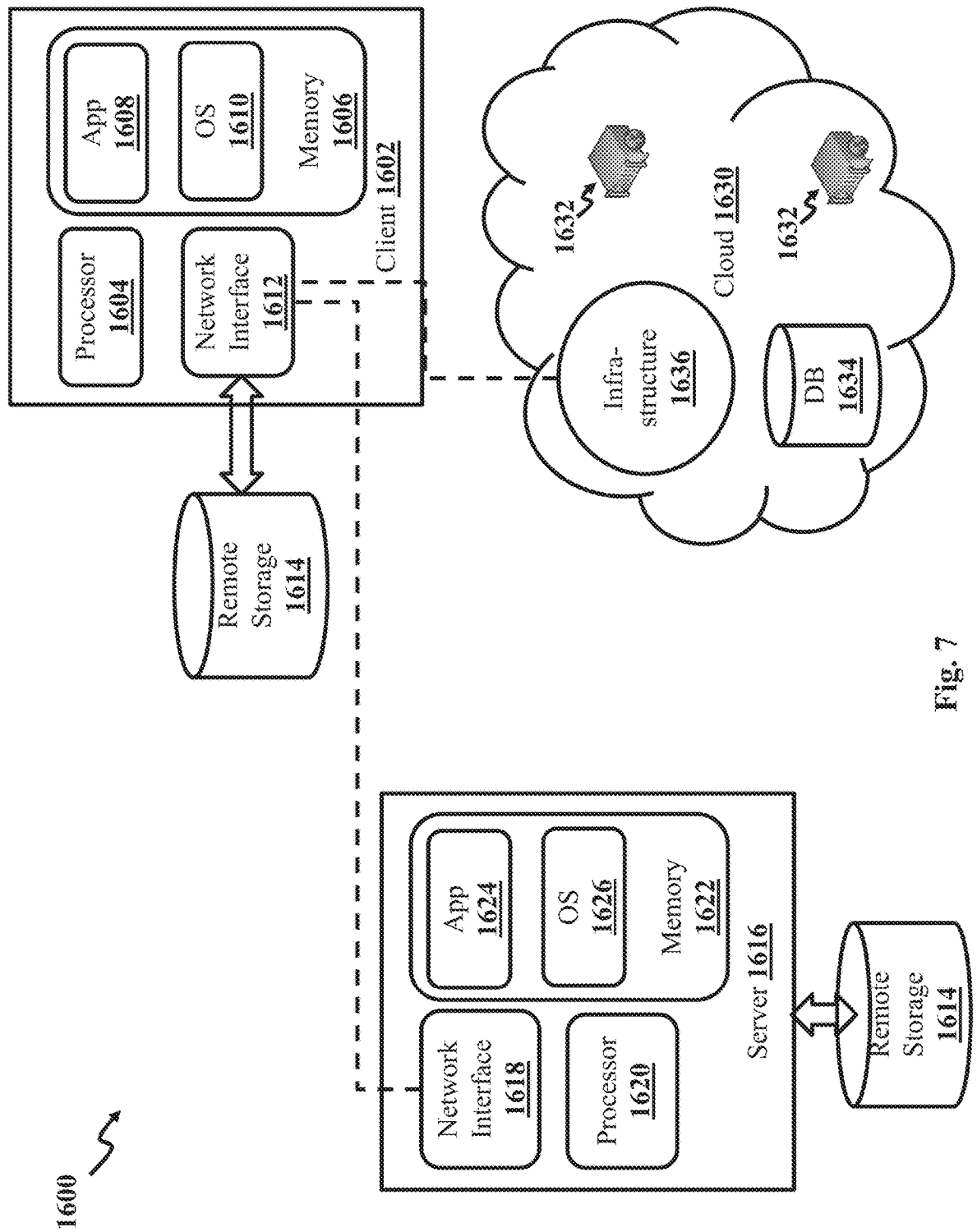
FIG. 7 is a diagram of interconnected electronic devices and data sources, according to an embodiment of the invention.

FIG. 7 is a context diagram 1600 of interconnected electronic devices and data sources configured to implement some embodiments, e.g., hardware, software, and communications environment. Client device 1602 can be any computing device. Exemplary computing devices include without limitation networked personal computers, tablet computers, smart phones, and smart televisions and/or media players.

A client device 1602 may have a processor 1604 and a memory 1606. Client device's 1602 memory 1606 is any computer-readable media which may store several software components including an application 1608 and/or an operating system 1610. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, 9 program modules, or other data in a modulated data signal, such as a carrier wave, or other transmission mechanism. As defined herein, computer storage media does not include communication media.

To participate in a communications environment, client device 1602 may have a network interface 1612. The network interface 1612 may be one or more network interfaces including, but not limited to, Ethernet, Wi-Fi, WLAN, Bluetooth, or any combination of other physical and data link standard interfaces.

In an embodiment, the network interface 1612 may be one or more network interfaces including, but not limited to, mesh network, peer to peer network, a primary blockchain network, a secondary blockchain network, a distributed ledger technology network or fabric, or the Ethereum® network. In the case where the user need only do operations on a standalone single machine, the network interface 1612 is optional.

Some embodiments use client device 1602 to collect demographic information from one or more individuals. Information can be collected by monitoring activity on the client device (e.g., websites visited, posts made to online applications), and/or requesting information from a user. In some embodiments, client device 1602 can be used to display results of the generation and application of profiles.

Client-Server/Multi-Tier

Client device 1602 may communicate to a server 1616. Server 1616 is any computing device that may participate in a network, e.g., server, database server, web server, etc. The network may be, without limitation, a local area network ("LAN"), a virtual private network ("VPN"), a cellular network, or the Internet. The client network interface 1612 may ultimately connect to remote networked storage 1614, or to server 1616 via server network interface 1618. Server network interface 1618 may be one or more network interfaces as described with respect to client network interface 1612.

Server 1616 also has a processor 1620 and memory 1622. As per the preceding discussion regarding client device 1602, memory 1622 is any computer readable media including both computer storage media and communication media.

In particular, memory 1622 is configured to store software which may include an application 1624 and/or an operating system 1626. Memory 1622 may also store applications 1624 that may include without limitation, an application server and a database management system. In this way, client device 1602 may be configured with an application server and data management system to support a multi-tier configuration.

Server 1616 may include a data store 1628 accessed by the data management system. The data store 1628 may be configured as a relational database, an object-oriented database, a NoSQL database, and/or a columnar database, or any configuration to support scalable persistence.

The server 1616 need not be on site or operated by the client enterprise. The server 1616 may be hosted on the Internet on a cloud installation 1630. The cloud installation 1630 may represent a plurality of disaggregated servers which provide virtual web application server 1632 functionality and virtual database 1634 functionality. Cloud services 1630, 1632, and 1634 may be made accessible via cloud infrastructure 1636. Cloud infrastructure 1636 not only provides access to cloud services 1632 and 1634 but also billing services. Cloud infrastructure 1636 may provide additional service abstractions such as Platform as a Service ("PAAS"), Infrastructure as a Service ("IAAS"), and Software as a Service ("SAAS").

In some embodiments, data store 1628 is configured to store data collected, data to be analyzed, and/or the results of the analysis by embodiments. Server 1616 can perform the collection and analysis of demographic data discussed above, and also serve out the results of the analysis, e.g., to client device 1602.

In some embodiments, cloud 1630 can be used, for example as a source of data discussed above, a storage location for data discussed above, and as a site of processing/analysis discussed above.

Conceptual Architecture

Figure 8:
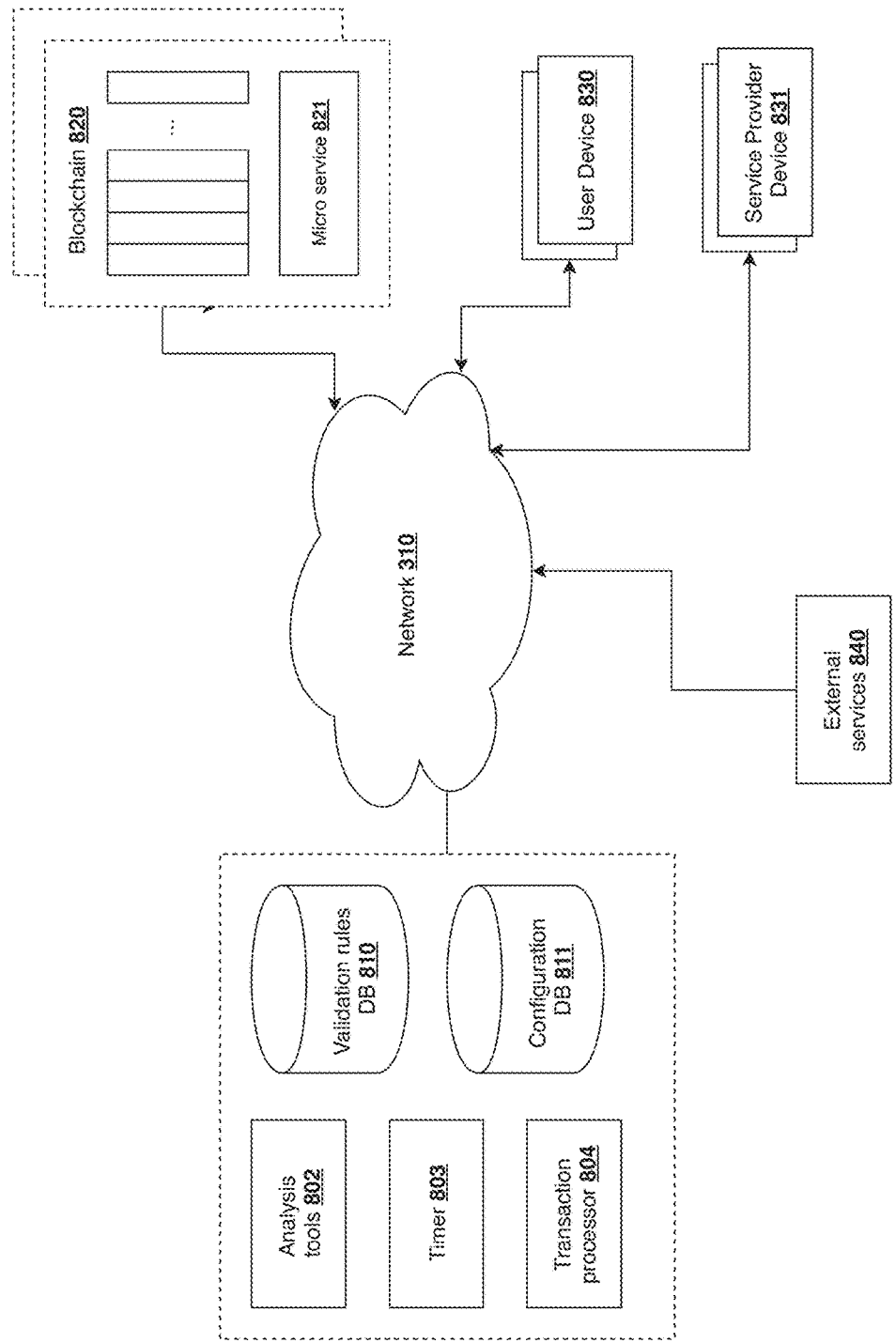
FIG. 8 is a block diagram illustrating a system for compliance using off-chain information, according to a preferred embodiment of the invention.

FIG. 8 is a block diagram illustrating a system for compliance using off-chain information, according to a preferred embodiment of the invention. According to the embodiment, a system for compliance comprises a plurality of programming instructions are stored in memory 101 and one or more processors 210, the programming instructions when executed by one or more processors 210 cause the processor to provide on-line and off-line compliance for a plurality of transactions on one or more block chains 830, the system, comprising: validator 801 to perform validation as described in FIG. 12; analysis tools 802 which may comprise a plurality of analysis techniques and methods including, but not limited to, facial recognition using stored and/or real-time images, interfacing with external services 840 which may comprise regulatory databases, rules, heuristic processes, and other analysis tools; timer 803 which may perform interval-based triggering of processes and transaction described herein; transaction processor 804 which may perform transaction processing (as described in FIG. 11) for one or more transactions from a database, a distributed database, and/or a blockchain environment comprising one or more blockchains 820; validation rules database 810 which may comprise a plurality of rules based on preconfigured rules from regulations, legal requirements (locally and globally) and the like; configuration database 811 which may comprise system elements and configuration for various system components; one or more blockchains 820, for example those described in FIG. 5; user devices 830 (for example, those that may run client applications 230) and perform system requests comprising, at least, transactions on blockchains 820; microservices 821 which may be similar to smart contracts, whereby they may be executed in isolation (on-chain) and communicate with the outside (off-chain) via a message-based channel. Microservices 821 may be small in size and developed to run auto-nomously and independently and, in a preferred embodiment, deployed on a decentralized network, for example, blockchains 820. A microservice 821, as described herein, may be an independent, deployable component of bounded scope that supports interoperability through message-based communication from other system components described herein. Service provider device 821 may be a user device used by a service provider.

Figure 9:
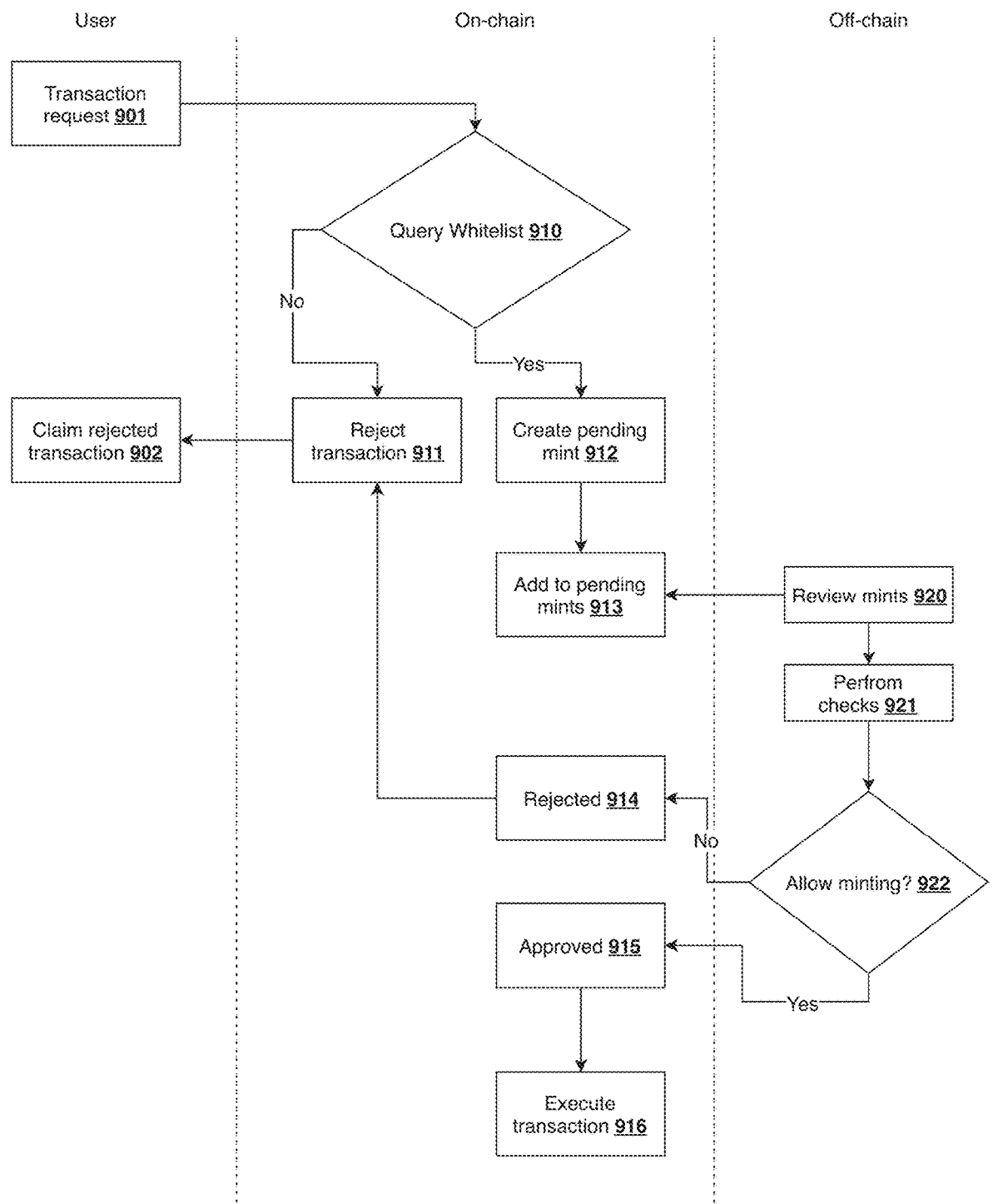
FIG. 9 is a flow diagram illustrating a method for communication between on-chain and off-chain for transaction compliance, according to a preferred embodiment of the invention.

FIG. 9 is a flow diagram illustrating a method for communication between on-chain and off-chain for transaction compliance, according to a preferred embodiment of the invention. According to the embodiment, in a first step 901, a request is received from a first address associated to a first user device 830 comprising a transaction, for example, a transaction representing an amount of money to send to a receiving user device 830 via a first blockchain 820.

In a next step 910, a transaction checker 821 (in some embodiments, implemented as a first micro service 821 resident on first blockchain 820) may analyze the first address associated and compared to a whitelist whereby a whitelist may be an on-chain database of addresses registered, and in some embodiments approved for transactions, in advance.

If the first address is not found on the whitelist by transaction checker 821, the transaction may be rejected, in step 911, and any associated attributes (for example, an amount of funds associated to the transaction) may be reassigned to the first address. Accordingly, in step 902, the first user device 830 may reclaim the rejected transaction. Otherwise, if the first address is found on the whitelist (referring again to step 910), in a next step 912, a pending mint is created by a smart contract associated to first blockchain 820, whereby minting may be a process of validating information (as shown herein) and creating a new block and recording that information into first blockchain 820. In a next step 913, the pending mint may be added, by transaction checker 821, to a list of pending mints.

In step 920, transaction processor 804 may receive at least a portion of pending mints from the list of pending mints (in some embodiments, pending mints are reviewed sequentially, in other embodiments, pending mints are accessed and reviewed dynamically). In a next step 921, transaction processor 804 may perform a plurality of checks to determine whether minting should be allowed, a plurality of checks according to FIG. 12. If minting is not allowed, the transaction is rejected in step 914 and processing continues at step 911. Otherwise, if minting is approved in step 915, the transaction is processed in a next step 916, for example, a plurality of tokens may be associated to an account associated to the first address, and a transaction amount is forwarded to a token issuer whereby the token issuer may be a technical process that creates the blockchain tokens or coins and distributes (or, in some embodiments sells) them to purchasing device 830. Purchasing device 830 may be the user devices representing entities being screened in the transaction verification workflow to determine if they are eligible to acquire tokens/coins.

Figure 10:
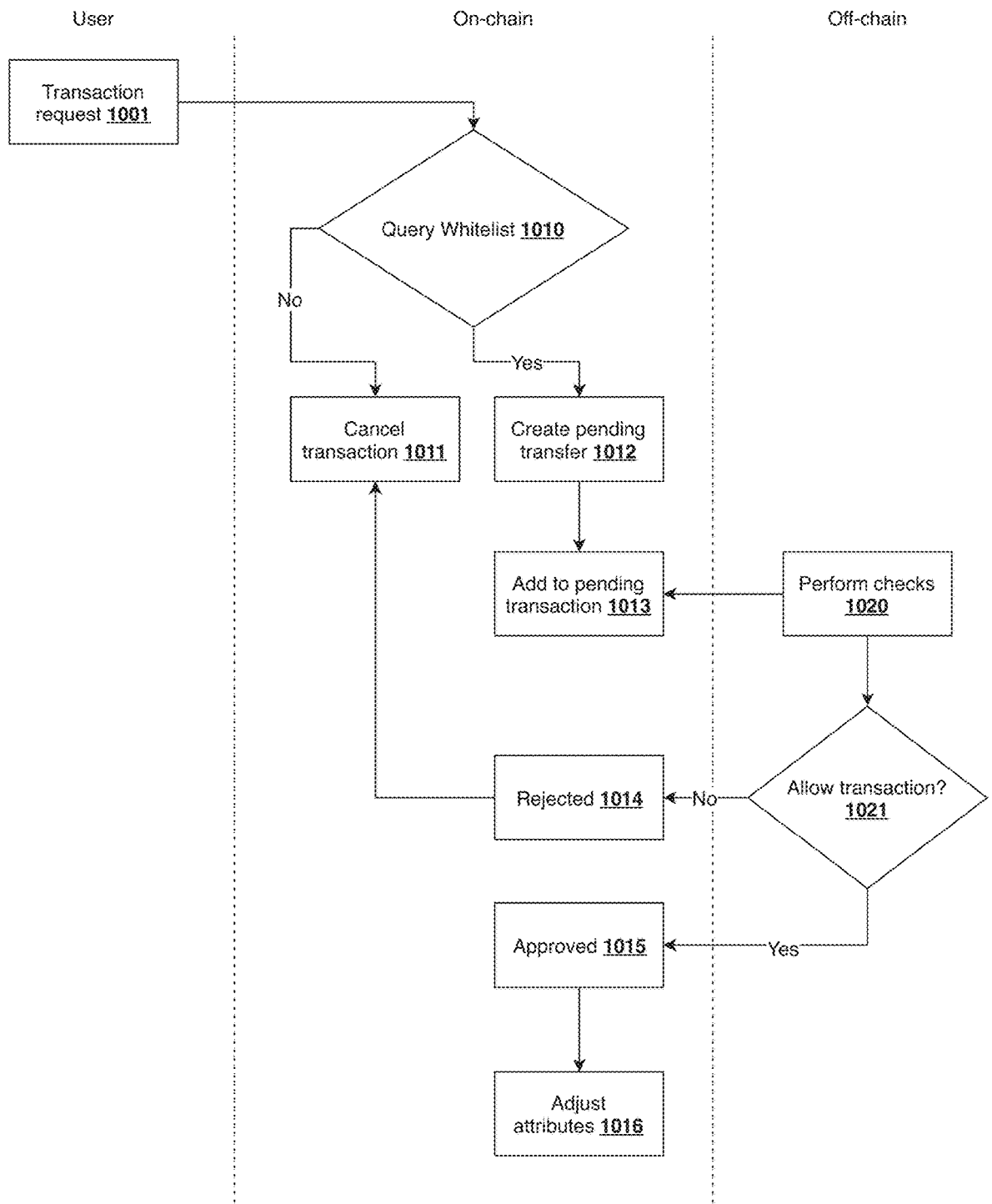
FIG. 10 is a flow diagram illustrating another method for communication between on-chain and off-chain for transaction compliance, according to a preferred embodiment of the invention.

FIG. 10 is a flow diagram illustrating another method for communication between on-chain and off-chain for transaction compliance, according to a preferred embodiment of the invention. According to the embodiment, in a first step 1001 a transaction is sent from a first address associated to a first user device 830 representing a token owner comprising a transaction (for example, associated to an exchange of value) to a transaction checker 821 (in some embodiments, implemented as a first micro service 821 resident on first blockchain 820). In a next step 1010, transaction checker 821 queries a whitelist whereby a whitelist may be a database of pre-configured addresses registered and, in some embodiments, approved for transactions. If an associated record is not found, by validator 801, then the transaction is canceled in step 1101. Otherwise, if the associated record is found on the whitelist, a pending transaction is created in step 1012 and added to the pending transaction list in step 1013.

Figure 12:
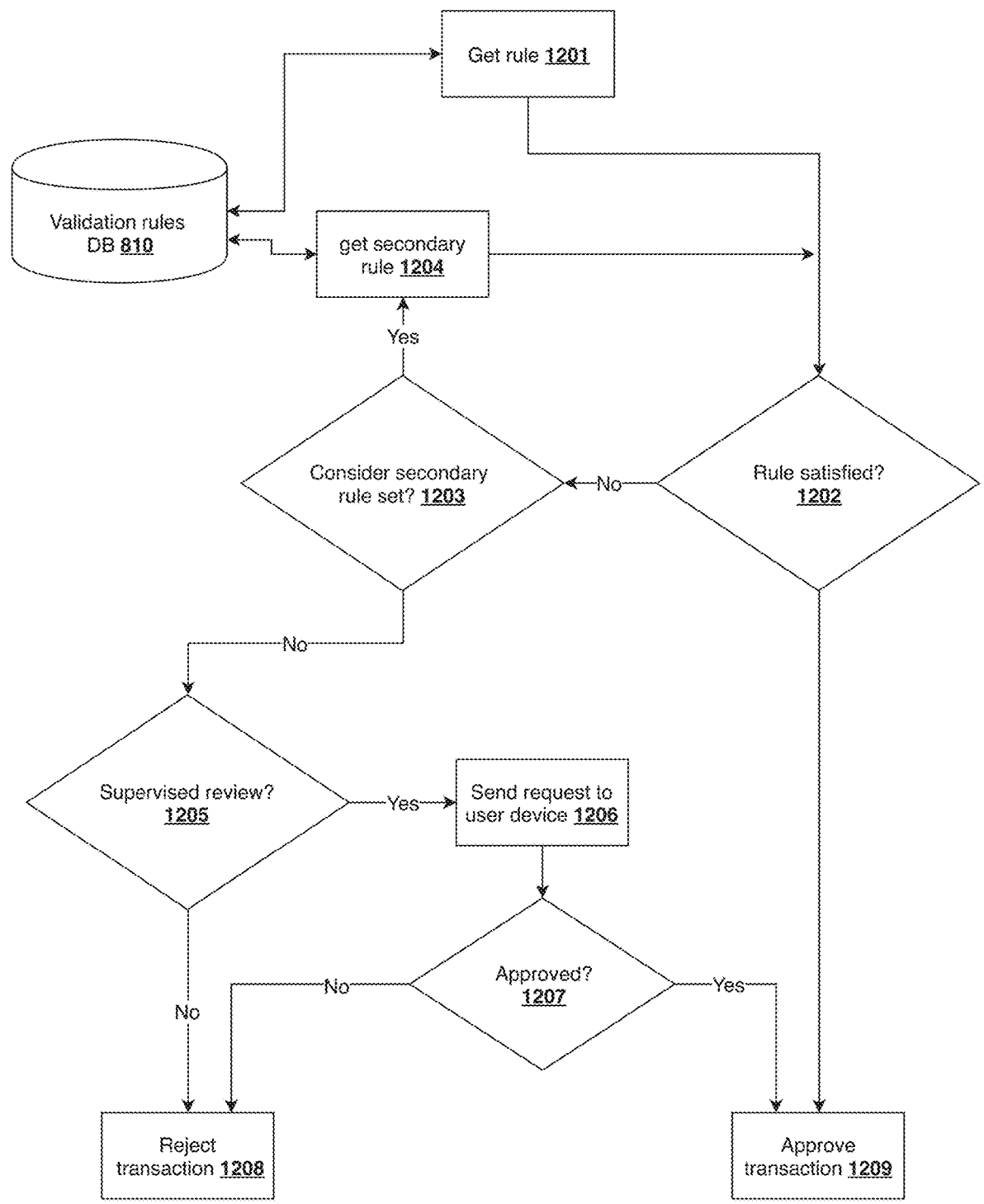
FIG. 12 is a flow diagram illustrating a method for processing off-chain validation of transactions in a blockchain environment, according to a preferred embodiment of the invention.

In a next step 1020, validator 801 reviews a first pending transaction and performs one or more checks based on the method disclosed in FIG. 12. If a rejected transaction is received, in step 1021, then the transaction is rejected in step 1014. Otherwise, referring again to step 1021, if an approval is received, then the transaction is approved in step 1015. Accordingly, transaction attributes may be adjusted in step 1016, for example, value or balances of a sending device (for example, the first user device 830, and another user device 830, the another device 830 associated to the transaction as a recipient).

Figure 11:
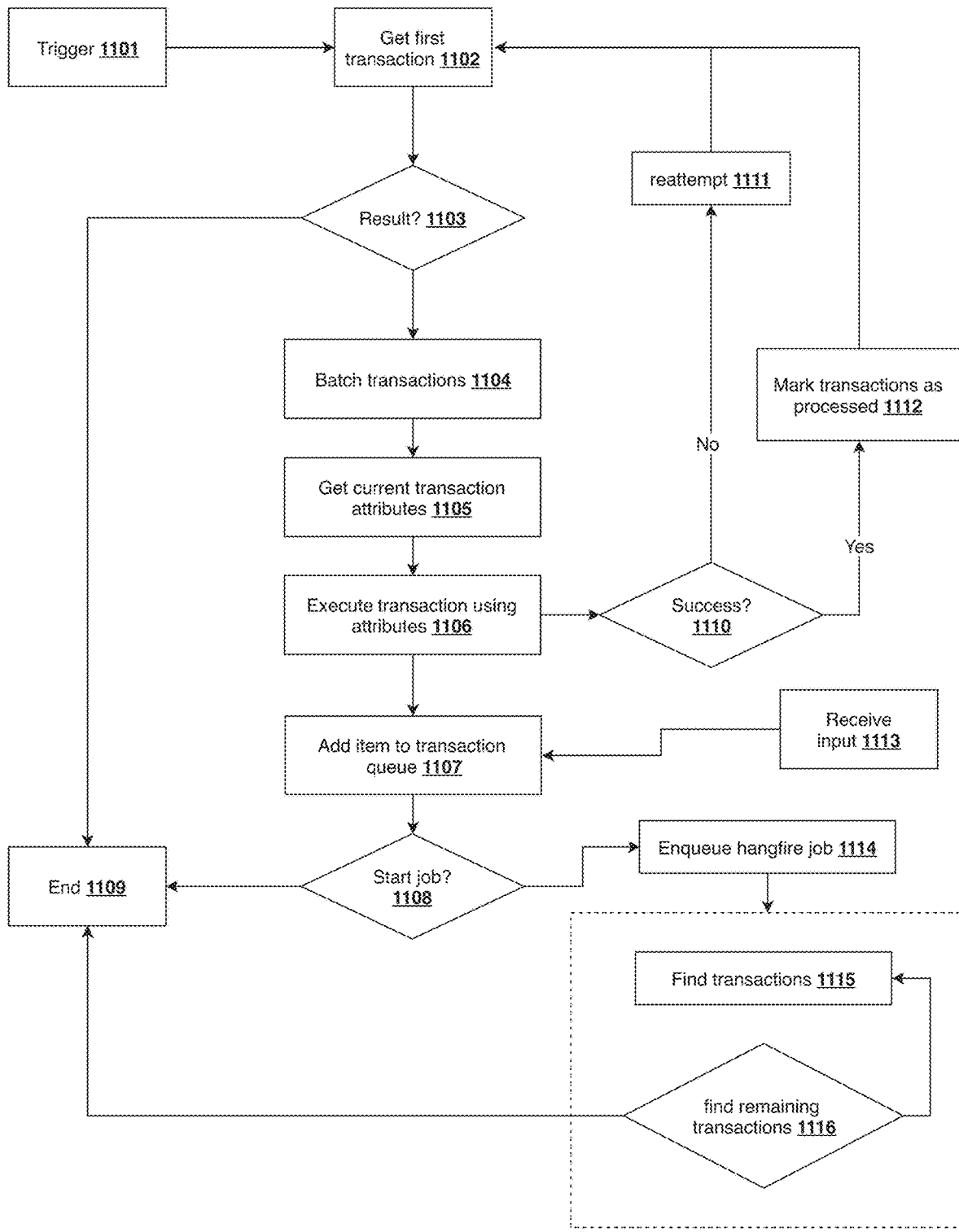
FIG. 11 is a flow diagram illustrating a method for processing transactions in a blockchain environment, according to a preferred embodiment of the invention.

FIG. 11 is a flow diagram illustrating a method for processing transactions in a blockchain environment, according to a preferred embodiment of the invention. According to the embodiment, in a first step 1101, a trigger is received from a user device 830 or from a times interval from timer 803. In a next step 1102, a first unprocessed transaction retrieved from a first blockchain 820 by transaction processor 804. In step 1103, if no transaction is available to process, the process ends in step 1009. Otherwise, in a next step 1104, transaction processor searches for similar transactions and attempts to batch a plurality of similar transactions. In a next step 1105, transaction attributes are analyzed, by transaction processor 804, for example, a transaction nonce associated to the transaction address. In a next step 1106, the plurality of transactions are executed using attributes, for example, the nonce. If processing is successful (that is, when the transaction request is approved by all layers of verification and validation and then the tokens are successfully transferred from one wallet to another using systems and methods described herein), in step 1110, then each transaction, of the plurality of transactions, is marked as processed and a plurality of associated results codes are updated. Processing returns to step 1102.

Referring again to step 1110, if processing is not successful, a reattempt to find transaction is made again and processing returns to step 1102.

Referring again to step 1106, processing continues in step 1107 whereby the transaction processor 804 adds transactions to a transaction queue. In a next step 1113, an approve or deny is received from a user device or a notification of registration by a user device registering to be added to the whitelist and request a transaction (i.e. purchase of a token) by a transaction checker 821. In a next step 1108, if transaction processor is required (for example, by a directive from a pre-configuration or notification from a user device, then a Hangfire job is enqueued in step 1114. Accordingly, a Hangfire job commences in step 1115, whereby transaction processor 804 finds transactions and performs blocking calls to execute against a first blockchain 820. In a next step 1116, a search for remaining transactions is conducted by transaction processor 804. If remaining transactions are found, processing returns to step 1115, otherwise, processing ends in step 1109. t should be noted that a Hangfire process, as used herein, may be a queuing framework that allows systems disclosed herein to process tasks that have an indeterminate execution time. Accordingly, background processing may occur asynchronously to perform an action once that task may complete or fail. In a preferred embodiment, a queue of pending transactions may be instantiated that are tied to a validator whereby a validator is an Ethereum™ address (or contract) that performs tasks against the blockchain (such as, add an address to an associated whitelist, remove an address from an associated whitelist, approve a pending mint, reject a pending mint, approve a pending transfer, reject a pending transfer, and the like). Multiple validators are necessary because transactions must be posted to the blockchain in a specific order, which is a transaction index known as a "nonce". Because Ethereum™ requires nonce values to be sequential as well as requiring all nonce values to be used, a system cannot simply increment the nonce for each transaction when it is attempted. When using a single validator, if multiple users attempt to initiate transactions before a previous one has completed, the subsequent transactions will fail. By keeping track of pending transactions and their respective validators in an off-chain queue, using systems described herein, ensures that processing of transactions and verifications occur in the correct order and allows a retry of transaction processing in the event of a failure. This ensures transactional integrity, especially under high load scenarios where many transactions are attempting to interact with a blockchain concurrently or in parallel and provides improvements over systems known in the art.

FIG. 12 is a flow diagram illustrating a method for processing off-chain validation of transactions in a blockchain environment, according to a preferred embodiment of the invention. According to the embodiment, in a first step 1201, a first rule of a plurality of rules, is retrieved from validation rules DB 810, by validator 801, to process a first transaction. Rules may comprise: governance rules; risk and compliance rules (for example, as mandated by law); facial recognition analysis, by analysis tools 802, to compare an associated user profile associated to a user of the transaction based on a previously filed image stored in a configuration database 811; accessing external services 840 to, for example, compare data associated to the transaction to criminal database, data clustered services, heuristics, and the like. In a next step 1202, the transaction is analyzed, by validator 801, to determine if the rule is satisfied. If the rule is satisfied, the transaction is approved in step 1209. Otherwise, if the transaction is not approved validator 801 determines, in a next step 1203, if there are secondary rules to consider. If so, a secondary rule is retrieved, in a next step 1204, from validation rules 810 and processed, in step 1202, by validator 801. Otherwise, referring again to step 1203, if no secondary rule is configured to be processed, validator determines, in step 1205, if a supervised review of the transaction must be performed. If no supervised review is required, the transaction is rejected in step 1208 and the validation process ends. Otherwise, referring again to step 1205, if a supervised review is required, then the transaction and associated parameters are sent to a second user device 830 (for example, a review device designated to review transactions). If an approval is received, from second user device 830, in step 1207, then the transaction is approved in step 1209, otherwise, the transaction is rejected in step 1208.

The skilled person will be aware of a range of possible modifications of the various embodiments described above. Accordingly, the present invention is defined by the claims and their equivalents.

What is claimed is:

1. A system for processing cryptographic transactions in a blockchain environment, the system comprising:
at least one verification computer comprising a memory, at least one processor and a plurality of programming instructions, the programming instructions when executed by the at least one processor cause the at least one processor to:
receive a request from an address associated with a first user device, the request indicative of a transactional value to be processed via a blockchain;
analyze the address by comparison of the address to a whitelist, wherein the whitelist comprises a database of one or more registered addresses;
in response to a determination that the address is found on the whitelist, create a pending transaction using a smart contract associated with the blockchain;
add the pending transaction to a list of pending transactions;
receive at least one transaction from the list of pending transactions to determine whether processing of the at least one transaction is allowed, the determination comprising performance of a plurality of checks, wherein at least one of the plurality of checks includes a facial recognition analysis that compares an image associated with a user profile of at least one transaction to a previously stored image;
responsive to at least one valid transaction based on one or more checks perform at least one action selected from the group consisting of:
creation of a pending mint,
initiation of a pending transfer, initiation of a transfer of tokens to the address associated with the first user,
creation of a new token,
update at least one attribute of a token associated with the transaction,
update at least one attribute of a token associated with the first user device,
update at least one attribute of a token associated with the identity of the first user,
update at least one attribute of the smart contract,
update at least one attribute of an address,
associate a plurality of tokens and/or coins to an account associated with the address, and
forward a transaction amount to a token issuer.

2. The system of claim 1, wherein the programming instructions when further executed by the at least one processor, cause the at least one processor to:
responsive to the address is not found on the whitelist, perform at least one action selected from the group consisting of:
reject the at least one transaction; and
assign one or more attributes associated with the at least one transaction to the first user device.

3. The system of claim 2, wherein the programming instructions when further executed by the at least one processor, cause the at least one processor to:
obtain a reclaim request for the rejected transaction from the first user device; and
process the at least one transaction based on the reclaim request.

4. The system of claim 1, wherein to perform the one or more checks, the programming instructions when further executed by the at least one processor, cause the at least one processor to:
perform a first check on the at least one transaction request to determine validity of the at least one transaction;
responsive to a determination that the second check is required, based on a result of the first check, perform the second check.

5. The system of claim 4, wherein the programming instructions when further executed by the at least one processor, cause the at least one processor to:
responsive to a determination that the supervised check is required, based on one or more results of the second check, perform at least one action selected from the group consisting of:
send transaction parameters, of the at least one transaction, to a second user device; and
submit the transaction parameters to the blockchain.

6. The system of claim 5, wherein the programming instructions further cause the at least one processor to:
perform at least one action selected from the group consisting of:
perform a review on the at least one transaction based on the first check and the second check; and
adjust one or more transaction attributes for the at least one transaction.

7. The system of claim 6, wherein the programming instructions further cause the at least one processor to:
analyze the one or more transaction attributes for the at least one transaction, wherein the one or more transaction attributes comprise, at least, a transaction nonce associated to the address;
process the at least one transaction based on the transaction nonce; and
label the at least one transaction as processed.

8. The system of claim 1, wherein creation of the at least one transaction comprises at least one action selected from the group consisting of:
creation of a pending mint,
initiation of a pending transfer,
creation of a new token,
update at least one attribute of a token associated with the transaction,
update at least one attribute of a token associated with the first user device,
update at least one attribute of a token associated with the identity of the first user,
update at least one attribute of the smart contract, and
update at least one attribute of an address.

9. The system of claim 4, wherein the programming instructions further cause the at least one processor to perform at least one action selected from the group consisting of:
maintain a second address on a blockchain, wherein the second address holds the plurality of blockchain tokens and/or coins in a queue, and
responsive to the first check is incomplete, return the plurality of blockchain tokens and/or coins the first address.

10. The system of claim 9, wherein the programming instructions further cause the at least one processor to, responsive to the first check is incomplete, return the plurality of blockchain tokens and/or coins to a unique address different from the first address and the second address.

11. The system of claim 2, wherein the programming instructions when further executed by the at least one processor, cause the at least one processor to abolish the plurality of blockchain tokens and/or coins associated with the rejected transaction.

12. The system of claim 4, wherein the programming instructions when further executed by the at least one processor, cause the at least one processor to update at least one attribute in a smart contract associated with at least one transaction of the one or more transactions.

13. A computer-implemented method for processing cryptographic transactions in a blockchain environment, the method comprising the steps of:
receiving, at a one or more verification computers, a request from an address associated with a first user device, the request indicative of a transactional value to be processed via a blockchain;
analyzing, by the one or more verification computers, the address by comparison of the address to a whitelist, wherein the whitelist comprises a database of one or more registered addresses;
in response to determining that the address is found on the whitelist, creating, by the one or more verification computers, a pending transaction using a smart contract associated to the blockchain;
adding, by the one or more verification computers, the pending transaction to a list of pending transactions;
receiving, by the one or more verification computers, at least one pending transaction from the list of pending transactions to determine whether processing of the at least one transaction is allowed, the determination comprising performance of a plurality of checks, wherein at least one of the plurality of checks includes a facial recognition analysis that compares an image associated with a user profile of at least one transaction to a previously stored image;

responsive to at least one valid transaction based on one or more checks performing, by the one or more verification computers, at least one action selected from the group consisting of:
  creating a pending mint,
  initiating a pending transfer,
  initiating a transfer of tokens to the address associated with the first user,
  creating a new token,
  updating at least one attribute of a token associated with the transaction,
  updating at least one attribute of a token associated with the first user device,
  updating at least one attribute of a token associated with the identity of the first user,
  updating at least one attribute of the smart contract,
  updating at least one attribute of an address,
  associating a plurality of tokens to an account associated with the address, and
  forwarding a transaction amount to a token issuer, to enable the token issuer for creation of a plurality of blockchain tokens and/or coins.

14. The method of claim 13, further comprising the steps of:
  responsive to determining that the address is not found on the whitelist, performing, by the one or more verification computers, at least one action selected from the group consisting of:
    terminating the at least one transaction; and
    reassigning one or more attributes associated with the at least one transaction to the address.

15. The method of claim 14, further comprising the steps of:
  obtaining, by the one or more verification computers, a reclaim request for the rejected transaction from the first user device; and
  processing, by the one or more verification computers, the at least one transaction based on the reclaim request.

16. The method of claim 13, wherein performing the one or more checks further comprising the steps of:
  performing, by the one or more verification computers, a first check on the at least one transaction to determine validity of the transaction;
  responsive to a second check is required, based on a result of the first check, performing, by the one or more verification computers, the second check.

17. The method of claim 16, further comprising the steps of:
  responsive to determining that the supervised check is required, based on one of the results of the first check and a result of the second check, performing, by the one or more verification computers, at least one action selected from the group consisting of:
    sending transaction parameters, of the at least one transaction, to a second user device; and
    submitting the transaction parameters to the blockchain, in response to an approval received from the second user device.

18. The method of claim 17, further comprising:
  performing, by the one or more verification computers, at least one action selected from the group consisting of:
    performing, by the one or more verification computers, a review on the at least one transaction based on the first check and the second check; and
    adjusting, by the one or more verification computers, one or more transaction attributes for the at least one transaction.

19. The method of claim 18, further comprising the steps of:
  analyzing, by the one or more verification computers, the one or more transaction attributes for the at least one transaction, wherein the one or more transaction attributes comprise, at least, a transaction nonce associated to the address;
  processing, by the one or more verification computers, the at least one transaction based on the transaction nonce; and
  labeling, by the one or more verification computers, the at least one transaction as processed.

20. The method of claim 13, wherein creating the at least one transaction comprises at least one action selected from the group consisting of:
  creating a pending mint,
  initiating a pending transfer,
  creating of a new token,
  updating at least one attribute of a token associated with the transaction,
  updating at least one attribute of a token associated with the first user device,
  updating at least one attribute of a token associated with the identity of the first user,
  updating at least one attribute of the smart contract, and
  updating at least one attribute of an address.

21. The method of claim 16, further comprising:
  performing, by the one or more verification computers, at least one action selected from the group consisting of:
    maintaining attribution of a second address on the blockchain to the first user device, wherein the second address holds the plurality of blockchain tokens and/or coins in a queue,
    responsive to the second address is found on the whitelist and has completed at least chain check, storing a new address submitted by the first user device,
    updating the smart contract on the blockchain,
    updating one or more attributes related to the first address or the second address, and
    approving transmission of the plurality of blockchain tokens and/or coins to one of the first address or the second address.

22. The method of claim 16, further comprising the step of updating, by the one or more verification computers, at least one attribute in a smart contract associated with at least one transaction of the one or more transactions.

* * * * *